US012648520B2

(12) United States Patent
Mazor et al.

(10) Patent No.: US 12,648,520 B2
(45) Date of Patent: Jun. 9, 2026

(54) ROBOTIC UNIT FOR HARVASTING A FRUIT WITH A STEM USING VACUUM AND MOVABLE CUTTING STEM ELEMENTS

(71) Applicant: Nanovel LTD, Ramot Menashe (IL)

(72) Inventors: Itzhak Mazor, Haifa (IL); Yoram Hanfling, Pardes Hana Karkur (IL); Avihai Rot, Ramot Menashe (IL)

(73) Assignee: Nanovel LTD, Ramot Menashe (IL)

( * ) Notice: Subject to any disclaimer, the term of this patent is extended or adjusted under 35 U.S.C. 154(b) by 724 days.

(21) Appl. No.: 18/063,071

(22) Filed: Dec. 7, 2022

(65) Prior Publication Data

US 2023/0247941 A1     Aug. 10, 2023

Related U.S. Application Data

(63) Continuation-in-part of application No. 17/645,309, filed on Dec. 20, 2021, now abandoned, which is a continuation of application No. 17/081,921, filed on Oct. 27, 2020, now Pat. No. 11,206,764.

(51) Int. Cl.
| | |
|---|---|
| *A01D 46/24* | (2006.01) |
| *A01D 46/30* | (2006.01) |
| *B25J 15/00* | (2006.01) |
| *B25J 15/06* | (2006.01) |

(52) U.S. Cl.
CPC ............. *A01D 46/30* (2013.01); *A01D 46/24* (2013.01); *B25J 15/0019* (2013.01)

(58) Field of Classification Search
CPC ............... B25J 15/0019; B25J 15/0066; B25J 15/0616; B25J 11/0055; A01D 46/253; A01D 46/24; A01D 46/30
See application file for complete search history.

(56) References Cited

U.S. PATENT DOCUMENTS

| | | | | |
|---|---|---|---|---|
| 2,475,687 A | * | 7/1949 | Baker .................. | A01D 46/247 |
| | | | | 43/92 |
| 2,990,669 A | * | 7/1961 | Klemm, Jr. .......... | A01D 46/253 |
| | | | | 56/334 |
| 3,377,787 A | * | 4/1968 | Mccann ............... | A01D 46/253 |
| | | | | 56/328.1 |
| 3,420,046 A | * | 1/1969 | Johnson ............... | A01D 46/005 |
| | | | | 406/52 |
| 3,559,387 A | * | 2/1971 | Myers .................. | A01D 46/005 |
| | | | | 56/334 |
| 3,572,021 A | * | 3/1971 | McDonald ........... | A01D 46/253 |
| | | | | 56/334 |
| 3,854,273 A | * | 12/1974 | Rosenberg ........... | A01D 46/247 |
| | | | | 56/336 |
| 4,060,962 A | * | 12/1977 | Cooper ................ | A01D 46/247 |
| | | | | 56/336 |

(Continued)

FOREIGN PATENT DOCUMENTS

| | | | | |
|---|---|---|---|---|
| CN | 107457795 A | * | 12/2017 | ......... B25J 15/0616 |
| CN | 209201574 U | | 8/2019 | |

*Primary Examiner* — Adam J Behrens
(74) *Attorney, Agent, or Firm* — Reches Patents

(57) ABSTRACT

A robotic unit for harvesting a fruit having a stem, the robot unit may include a vacuum unit that is configured to move the fruit, by applying vacuum, towards a cutting region; and a mechanical cutting unit that is configured to mechanically cut the stem following a positioning of the fruit into the cutting region.

15 Claims, 17 Drawing Sheets

(56)                References Cited

U.S. PATENT DOCUMENTS

| | | | | |
|---|---|---|---|---|
| 4,519,193 | A * | 5/1985 | Yoshida | B25J 9/046 |
| | | | | 348/89 |
| 4,663,925 | A * | 5/1987 | Terada | B25J 5/007 |
| | | | | 414/730 |
| 4,718,223 | A * | 1/1988 | Suzuki | A01D 46/005 |
| | | | | 56/332 |
| 5,005,347 | A * | 4/1991 | Kedem | A01D 46/253 |
| | | | | 56/332 |
| 7,540,137 | B2 * | 6/2009 | Gray | A01D 46/30 |
| | | | | 56/13.1 |
| 7,765,780 | B2 * | 8/2010 | Koselka | A01D 46/30 |
| | | | | 701/50 |
| 7,810,305 | B2 * | 10/2010 | Macidull | A01D 46/247 |
| | | | | 56/333 |
| 10,674,666 | B2 * | 6/2020 | Moore | A01D 46/005 |
| 11,206,764 | B1 | 12/2021 | Mazor et al. | |
| 11,445,663 | B2 * | 9/2022 | Xiong | A01D 46/247 |
| 11,540,444 | B2 * | 1/2023 | Salisbury | B25J 15/0658 |
| 12,063,889 | B2 * | 8/2024 | Lu | A01D 46/24 |
| 2010/0212279 | A1 | 8/2010 | Macidull | |
| 2017/0273241 | A1 * | 9/2017 | Salisbury | A01D 46/24 |
| 2019/0029178 | A1 * | 1/2019 | Russel | A01D 46/30 |
| 2020/0196528 | A1 * | 6/2020 | Salisbury | B25J 9/1679 |
| 2020/0288636 | A1 * | 9/2020 | Kent | A01D 46/00 |
| 2020/0323140 | A1 * | 10/2020 | Gielis | A01D 46/24 |
| 2021/0267125 | A1 * | 9/2021 | Lu | B25J 19/023 |
| 2021/0337734 | A1 * | 11/2021 | Jeanty | B65G 47/914 |
| 2022/0078972 | A1 * | 3/2022 | Faulring | B25J 15/0226 |
| 2022/0118629 | A1 * | 4/2022 | Payton | B25J 15/10 |
| 2022/0183231 | A1 | 6/2022 | Mazor et al. | |
| 2023/0189712 | A1 * | 6/2023 | Yokoue | A01D 46/30 |
| | | | | 56/328.1 |
| 2025/0160253 | A1 * | 5/2025 | Chen | A01D 46/30 |

* cited by examiner

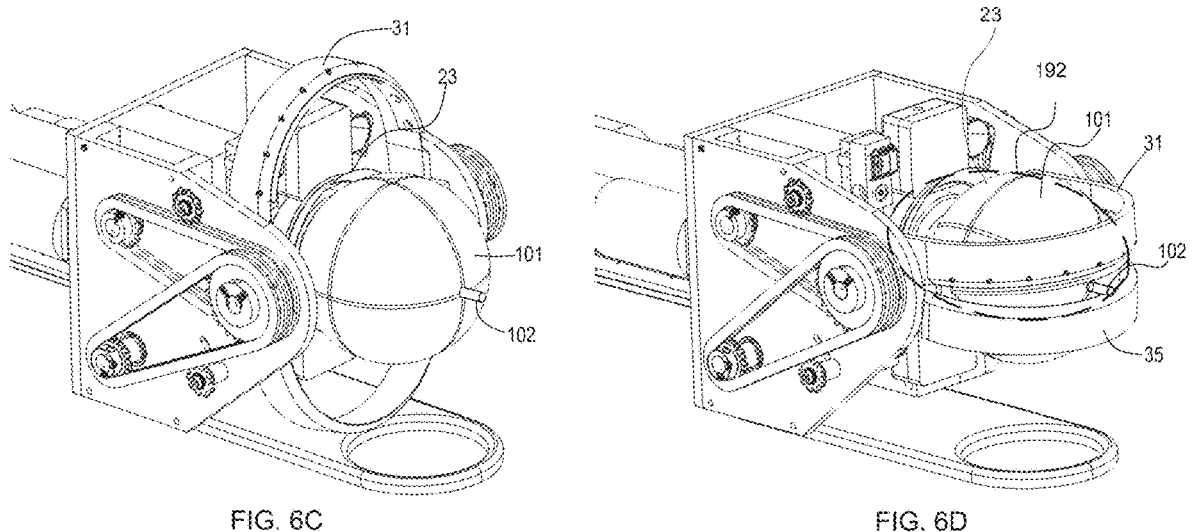
FIG. 6C                                      FIG. 6D

Moving the fruit towards a cutting region, by applying vacuum by a vacuum unit of a robotic unit. 310

Mechanically cutting the stem, by a mechanical cutting unit of the robotic unit, following a positioning of the fruit in the cutting region. 320

300

301

ROBOTIC UNIT FOR HARVASTING A FRUIT WITH A STEM USING VACUUM AND MOVABLE CUTTING STEM ELEMENTS

BACKGROUND

Fruit harvesting is a complex task that requires to approach the fruit that is connected to a stem, and cut the stem in an accurate manner and with minimal damage to the fruit.

Most fruits are harvested in a manual manner-which is highly inefficient.

There is a growing need to provide a robotic arm that may cut the stem in an accurate manner and with minimal damage to the fruit.

SUMMARY

There may be provided systems, and methods as illustrated in the specification.

BRIEF DESCRIPTION OF THE DRAWINGS

The embodiments of the disclosure will be understood and appreciated more fully from the following detailed description, taken in conjunction with the drawings in which:

FIGS. 6A-6H illustrate examples of stages in a harvesting of a fruit;

DESCRIPTION OF EXAMPLE EMBODIMENTS

Figure 1A:
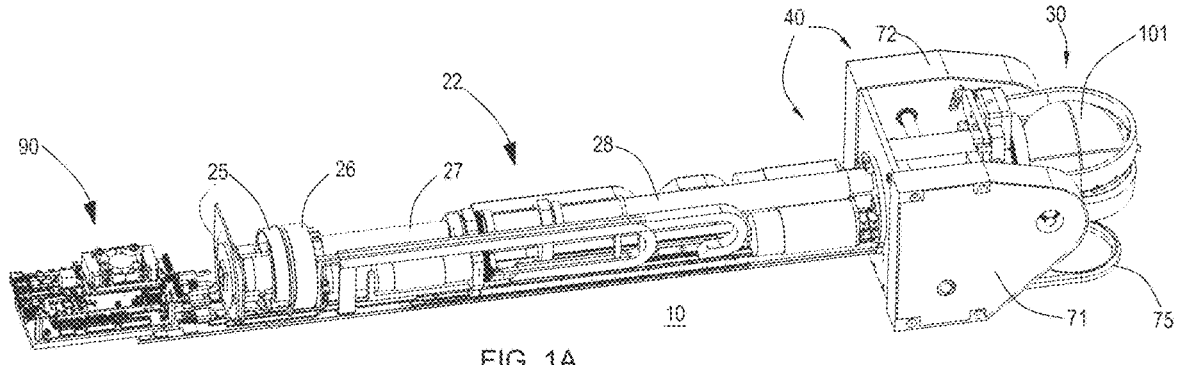
FIGS. 1A-1C illustrate examples of a robotic unit.
Figure 1B:
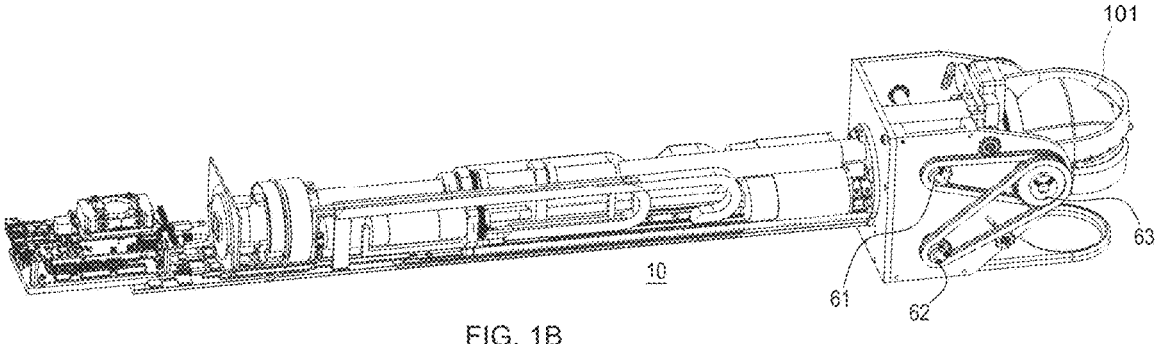
Figure 1C:
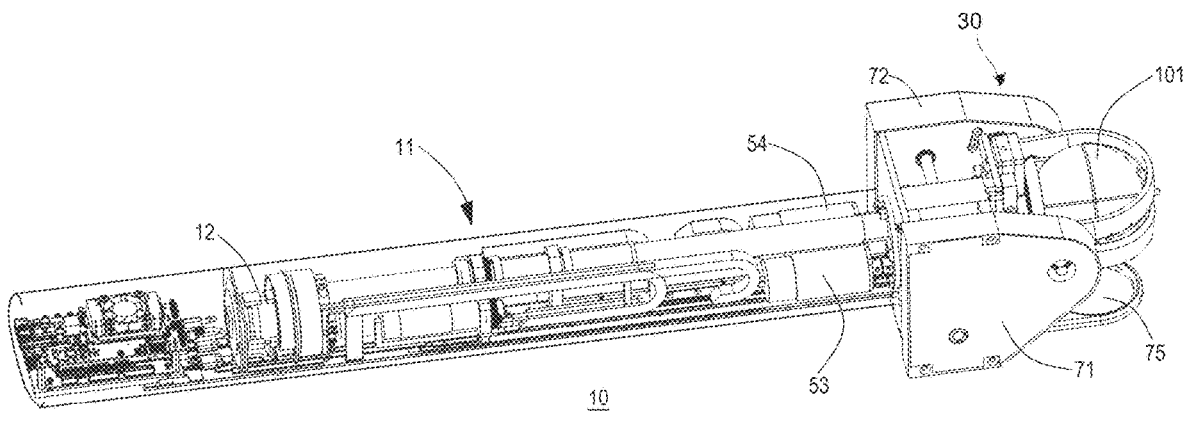
Figure 2A:
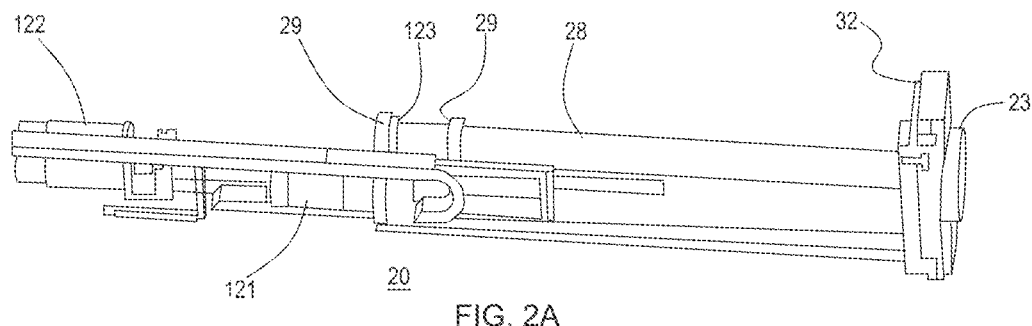
FIGS. 2A-2B, and 3 illustrate examples of parts of a vacuum unit of the robotic unit.
Figure 2B:
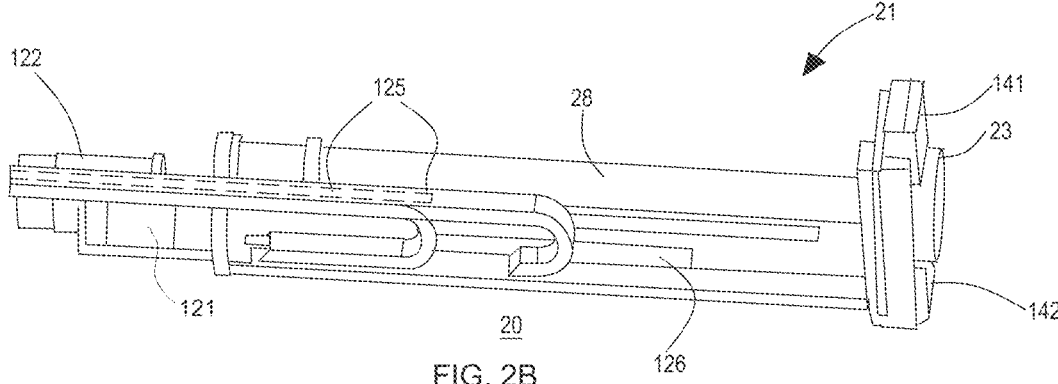
Figure 3:
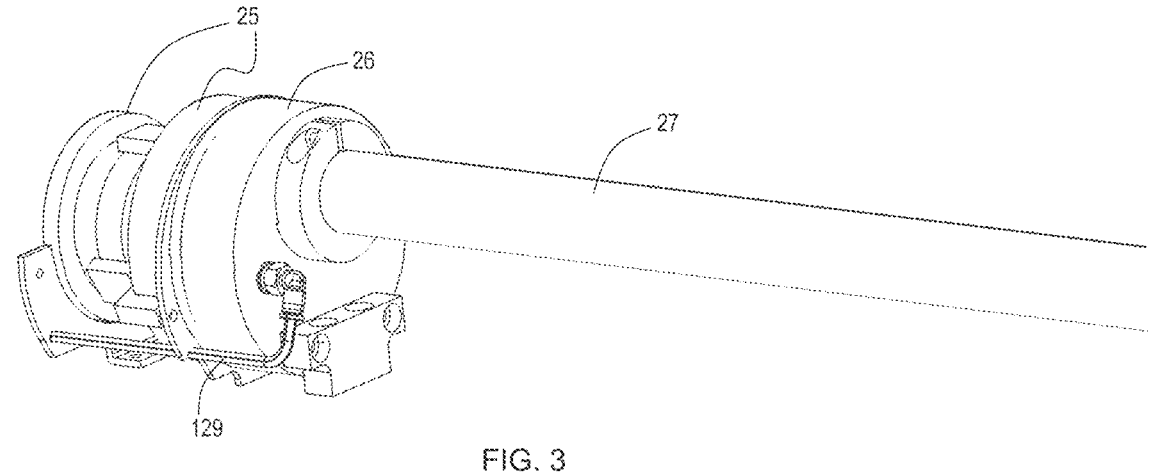
Figure 4:
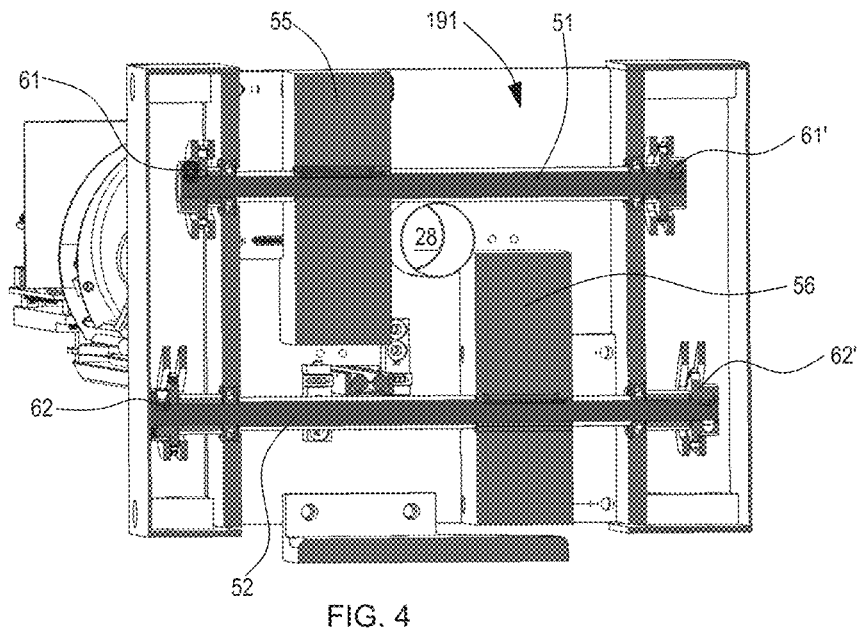
FIGS. 4, 5A and 5B illustrate examples of parts of a mechanical cutting unit and of a vacuum unit of the robotic unit.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method.

Any reference in the specification to a system or device should be applied mutatis mutandis to a method that may be executed by the system.

Any combination of any module or unit listed in any of the figures, any part of the specification and/or any claims may be provided.

There may be provided a robotic unit that is configured to utilize at least a vacuum unit for moving a fruit having a stem to a cutting region. A mechanical cutting unit cuts the stem when the fruit is located in the cutting region.

The combination of the vacuum unit and the mechanical cutting unit may be highly effective. The combination does not damage the fruit-especially in cases where using only vacuum may damage the fruit—as the fruit is succeed and the step may be improperly detached from the fruit.

The fruit may be located in the cutting region solely by the vacuum unit—or by a combination of the vacuum unit and the mechanical cutting unit.

The vacuum unit may be used to remove the fruit from an initially location of the fruit in which the stem is hard to access-especially when there are multiple fruits that are adjacent from each other.

It should be noted that the robotic unit may use only its vacuum unit-especially in cases where the fruit can be successfully harvested using only vacuum.

FIGS. 1A, 1B, 1C, 2A, 2B, 3, 4, 5A and 5B illustrate examples of a robotic unit and/or of parts of the robotic unit. FIGS. 6A-6H illustrates stages of harvesting a fruit with a stem.

Table 1 provides mapping between units and/or parts of units, reference numbers used in the figures and where a component belongs to. The fruit is denoted 101 and the stem is denoted 102.

| Unit/part | Ref # | Belongs to | Remarks |
|---|---|---|---|
| Robotic unit (RU) | 10 | | |
| Vacuum unit (VU) | 20 | | |
| Vacuum suction head (VSH) | 21 | VU | |
| VSH manipulator | 22 | VU | Moves VSH |
| VSH interface | 23 | UV | Interfaced with fruit |
| Vacuum motor | 25 | VU | Generated vacuum |
| Vacuum guide | 26 | VU | Conveys vacuum |
| Static vacuum tube | 27 | VU | |
| Static vacuum tube segments | 27-1, 27-2, 27-3, 27-4 | VU | Allows sensing vacuum at different segments |

-continued

| Unit/part | Ref # | Belongs to | Remarks |
|---|---|---|---|
| Rotatable vacuum tube | 28 | VU | Enables the robotic unit to rotate the fruit while vacuum is applied |
| Rotatable vacuum tube segments | 28-1, 28-2, 28-3 | VU | Allows sensing vacuum at different segments |
| Vacuum sensor guide | 29 | VU | Fluid communication between sensors and tube or segments |
| Vacuum tube rotating motor | 121 | VSH manipulator | Rotates the rotatable vacuum tube |
| Vacuum tube translation motor | 122 | VSH manipulator | Linear movement of the rotatable vacuum tube |
| Gear related to vacuum tube rotating motor | 123 | VSH manipulator | Transfer movements from motor to rotatable vacuum tube |
| Rotation bearings | 124 | VSH manipulator | Assists in the transfer of said movements |
| Electrical cable guides | 125 | VSH manipulator | |
| Vacuum tube translation slide | 126 | VSH manipulator | |
| Mechanical cutting unit (MCU) | 30 | | Cuts the stem |
| First stem cutting element | 31 | MCU | |
| Blade | 32 | First stem cutting element | |
| Blade support element | 33 | First stem cutting element | |
| Second stem cutting element | 35 | MCU | |
| Cutting surface | 36 | Second stem cutting element | |
| Cutting surface support element | 37 | Second stem cutting element | |
| MCU manipulator | 40 | MCU | |
| First axle | 51 | MCU manipulator | For rotating first sprockets |
| Second axle | 52 | MCU manipulator | For rotating second sprockets |
| Motors | 53, 54 | MCU manipulator | For providing rotational movement to the gears |
| Gears | 55, 56 | MCU manipulator | |
| First chains | 57, 59 | MCU manipulator | Mechanical communication between first and second sprockets of first axel |
| Second chains | 58, 60 | MCU manipulator | Mechanical communication between first and second axel |
| First sprocket (first side) | 61,62 | MCU manipulator | |
| First sprocket (second side) | 61', 62' | MCU manipulator | |
| Second sprocket (first side) | 63 | MCU manipulator | Includes second inner sprocket 63-1 and second outer sprocket 62-2 (first side) |
| Second sprocket (second side) | 63' | MCU manipulator | Includes second inner sprocket 63-1' and second outer sprocket 62-2' (second side) |
| Vacuum sensor | 70 | | |
| Vacuum sensor | 70-1, 70-2, 70-3, 70-4 | | |
| First housing | 71 | | Houses multiple mechanical elements |
| Second housing | 72 | | Houses multiple mechanical elements |
| Fruit support element | 75 | | Support fruit after the stem is cut |

-continued

| Unit/part | Ref # | Belongs to | Remarks |
|---|---|---|---|
| Fruit collector | 77 | | Collects fruits after being cut |
| Mechanical separator | 79 | | Forming vacuum tube segments |
| Controller | 90 | | Controls robotic unit |
| Vacuum conduit | 129, 129-1, 129-2 | | |
| First camera | 141 | | Images the space in front the robotic unit |
| Second camera | 142 | | Images the space in front the robotic unit |
| Internal region | 191 | | |
| Cutting region | 192 | | The stem may be cut when the fruit is positioned in the cutting region |

There is provided a robotic unit 10 for harvesting a fruit having a stem, the robot unit includes (a) a vacuum unit (VU) 20 that is configured to move the fruit, by applying vacuum, towards a cutting region; and (b) a mechanical cutting unit (MCU) 30 that is configured to mechanically cut the stem following a positioning of the fruit into the cutting region.

The robotic unit may include a mechanical cutting unit (MCU) manipulator 40 that is configured to direct the cutting region towards the fruit following an formation of vacuum with the fruit.

The MCU manipulator is configured to direct the cutting region towards the fruit following an formation of vacuum with the fruit and an initial pull of the fruit by vacuum.

The VU 20 is configured to move a fruit having a stem, by applying vacuum, into the cutting region.

The VU and/or the MCU may participates in moving the fruit into the cutting region.

The VU may include VSH 21, and VSH manipulator 22 that is configured to move the VSH, wherein the VSH 21 includes a VSH interface 23 for interfacing with the fruit.

The VSH manipulator is configured to move the VSH 21 to a fruit contact position while the fruit is positioned outside the cutting region, and to move the VSH to a fruit cutting position in which the fruit is placed within the cutting region.

The VSH interface 23 may be elastic.

The VSH manipulator 22 may be configured to move the VSH interface 21 from a (i) first position in which the VSH interface is located within the cutting region, to (ii) a second position in which the VSH interface is located outside the cutting region.

The robotic unit may include one or more vacuum sensors (for example vacuum sensor 70 and/or two or more of vacuum sensors 70-1, 70-2, 70-3 or 70-4—that are configured to sense vacuum values at one or more regions of the fruit.

The robotic unit may include a controller 90 that is configured to control at least one parameter of the harvesting of the fruit based on outputs from the one or more vacuum sensors. The at least one parameter may include the location of the robotic unit and/or the orientation of the robotic unit and/or the spatial relationship between the robotic unit and the fruit and/or the manner in which the VU and/or MCU and/or, CU manipulator will be used to the harvesting.

Figure 7:
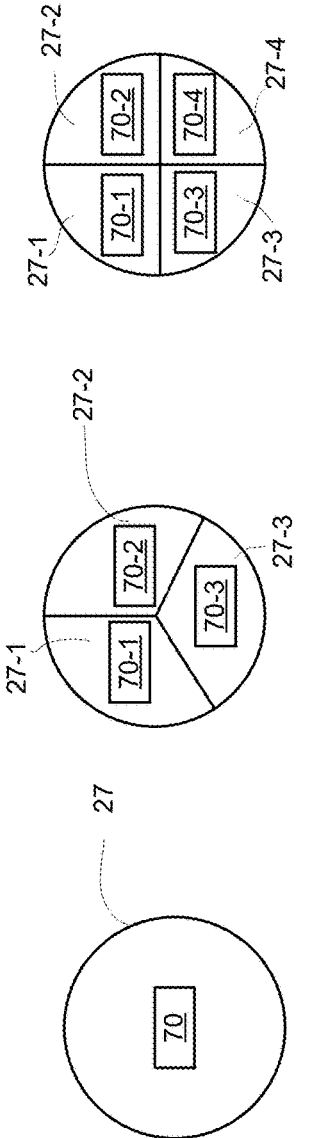
FIG. 7 illustrates examples of vacuum sensing and amending a position of the vacuum unit in relation to the fruit.
Figure 7:
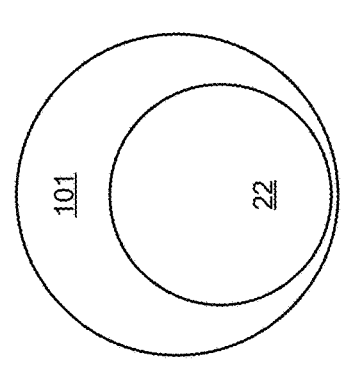
Figure 7:
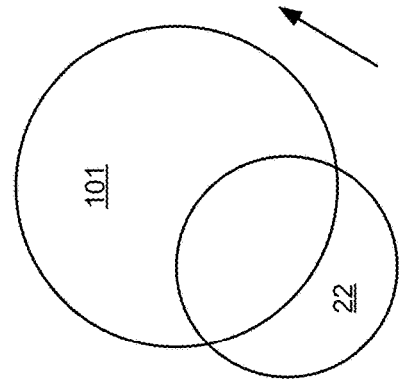

There may be multiple vacuum sensors and that sense vacuum at multiple regions of the fruit—there may be any number of vacuum sensors and/or any number of regions—see for example three regions and four regions in FIG. 7.

The robotic unit may include a fruit support element 75 configured to support the fruit following the cutting of the stem. The fruit may be provided from the fruit support element 75 to a fruit collector 77.

The mechanical cutting unit may include one or more stem cutting elements and one or more stem cutting elements manipulators that are configured to move the one or more stem cutting elements during a cutting of the stem.

For example—the one or more stem cutting elements may include first stem cutting element 31 a second stem cutting element 25.

Figure 5A:
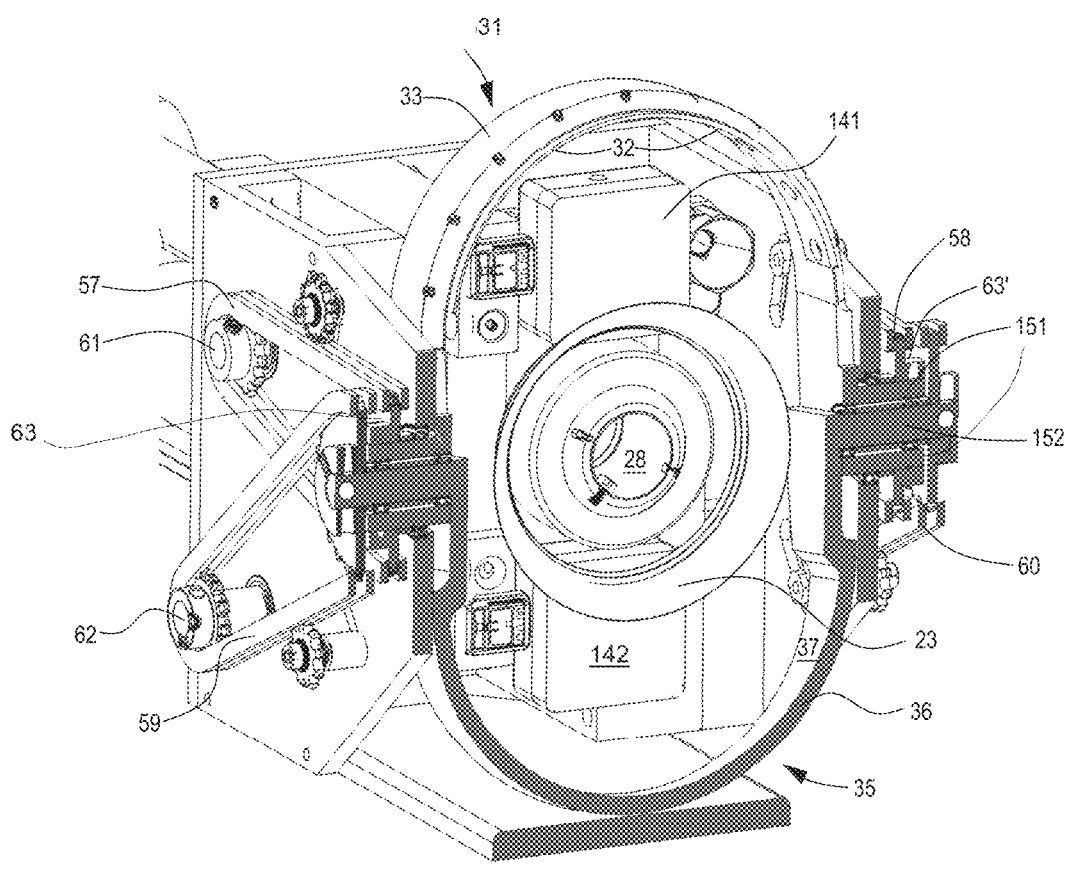
Figure 5B:
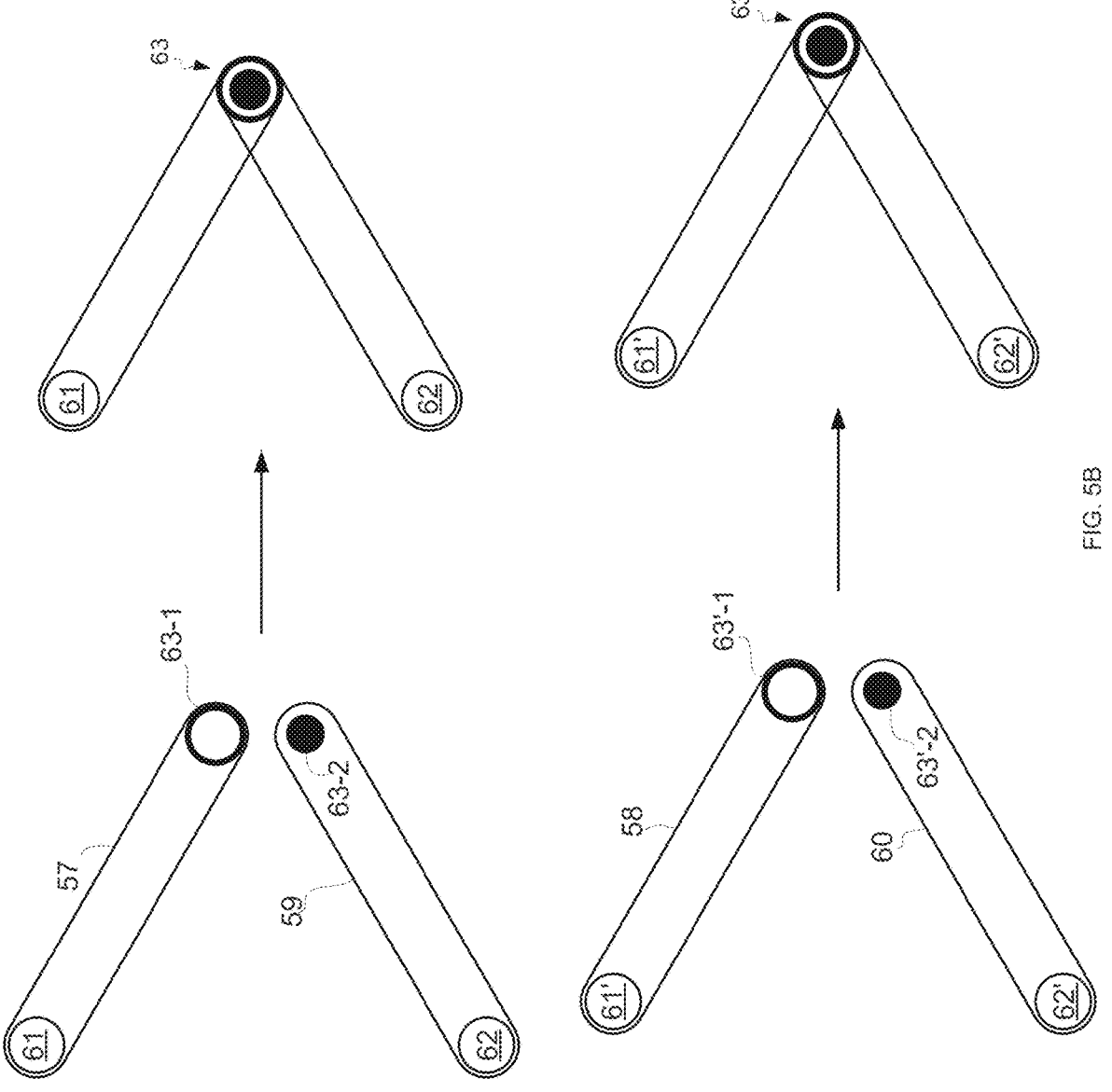
Figures 6A, 6B:
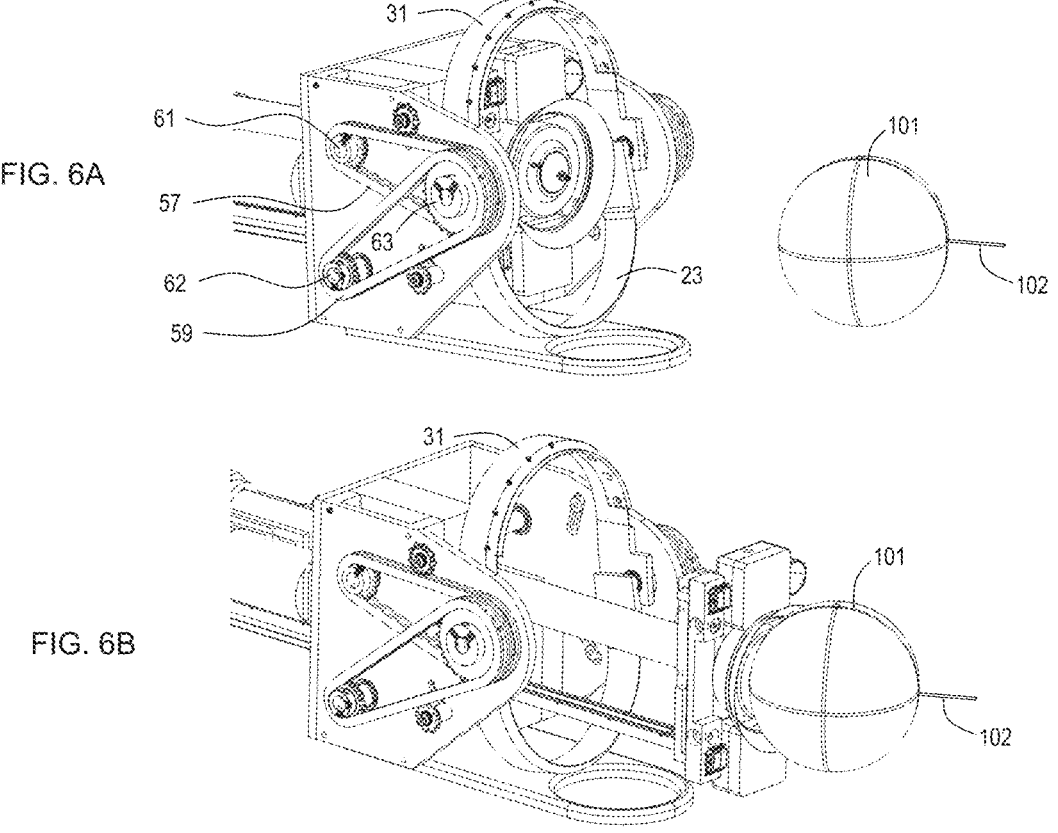

The first stem cutting element may include blade 32 (FIG. 5 illustrates a blade that includes multiple spaced apart segments while FIG. 6A illustrates a single blade segment), and blade support element 33. Second stem cutting element 35 may include cutting surface 38 (which counters the blade during the cutting of the stem) and a cutting surface support element 37.

The one or more manipulators are configured to rotate the first stem cutting element and the second stem cutting element during a cutting of the stem. For example—see FIGS. 6A-6H that include clockwise rotation of first stem cutting element and counterclockwise rotation of the second stem cutting element.

The one or more manipulators may be configured to rotate the first stem cutting element about a first axis (denoted 151 in FIG. 5) and to rotate the second stem cutting element about a second axis (denoted 152 in FIG. 5) that is concentric to the first axis.

The one or more manipulators are configured to rotate the second stem cutting element about a second axis to a stem supporting position, and then rotate the first stem cutting element to cut the stem. FIG. 6D illustrate the first and second stem cutting elements just before the cutting (the second stem cutting element is at the stem supporting position), while FIG. 6D illustrates the completion of the cutting of the stem.

Figure 8:
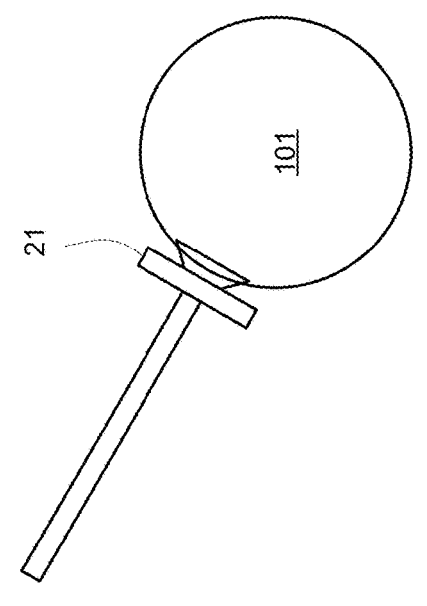
FIG. 8 illustrates examples of positions of the vacuum unit in relation to the fruit.
Figure 8:
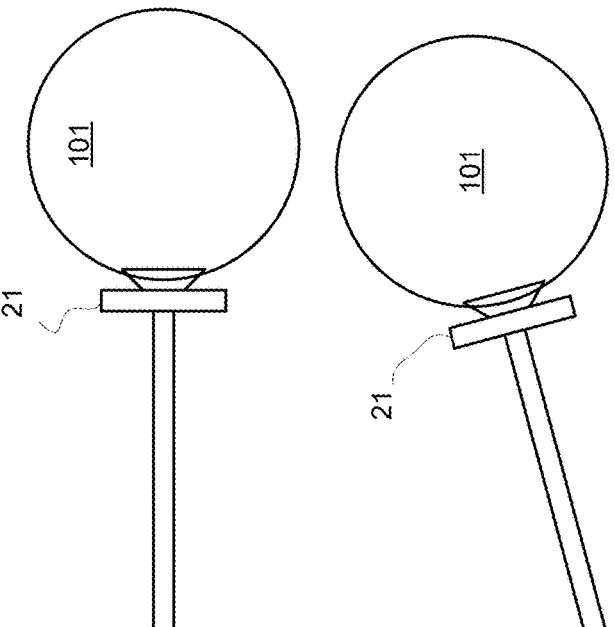

The robotic unit may include a controller 80 that is configured to determine an angle of rotation of the second step cutting element to be positioned in the stem supporting position, wherein the angle of rotation is selected out of an allowable range of angles of rotation. The angle of rotation is selected so that the second step cutting element (when positioned in the stem supporting position) supports the lower part of the stem. Before the cutting the stem may be oriented at any angle and the robotic unit itself may be oriented at any angle. FIG. 8 illustrates a few examples of the angular relationship between the VSH and the fruit.

The robotic unit may include one or more motors, gears, axels, first chains, second chains, first sprockets and second sprockets. The one or more motors (for example motors 53 and 54) are configured to rotate the gears (for example 55 and 56). The gears are configured to rotate the axels (for example 51 and 52) that rotate the first sprockets (for example 61, 62, 61' and 62'). The first sprockets are configured to rotate the chains (for example 57, 58, 59 and 60). The chains are configured to rotate the second sprockets (for example sprockets 63 and 63'—each may be a double sprocket), wherein the second sprockets (63 and 63') are configured to rotate the first stem cutting element and the second stem cutting element.

The following mechanical elements participate in the rotation of the first stem cutting element 31—motor 53, gear 55, axel 51, first sprockets 61 and 61', chains 57 and 59, and outer segments 63-1 (see FIG. 5B) and 63'-1 of second sprockets 63 and 63'.

The following mechanical elements participate in the rotation of the second stem cutting element 35—motor 54, gear 56, axel 52, first sprockets 62 and 62', chains 58 and 60, and inner segments 63-2 (see FIG. 5B) and 62'-1 of second sprockets 63 and 63'.

The chains, the first sprockets and second sprockets may be positioned on both sides of an internal region 191 of the robotic unit (for example in, the internal region partially overlaps the cutting region 192 of FIG. 6D)—for example within first hosing 71 and second housing 72.

The robotic unit may include one or more cameras (for example first camera 141 and second camera 142 (of FIG. 5A)—for sensing at least the fruit and its surroundings. There may be more than two cameras, a single camera or any other sensor for assisting in the harvesting. Sensed information from any sensor may be fed to the controller and assist the controller to control the harvesting. Images from any of the cameras may be processed to determine whether the fruit is located in the cutting region and/or whether the fruit is aligned with the VSH, and the like.

FIG. 5B illustrate the first sprockets, the second sprockets and the chains from both sides of the MCU-when separated from each other and when assembled to the MCU.

FIG. 6A-6H illustrate various phases of the harvesting process:

FIG. 6A-Initial approach to the fruit 101 with the step 102.

FIG. 6B—The VSH manipulator moves the VSH away from the MCU—to contact the fruit 101.

FIG. 6C—The MCU attracts the fruit towards the cutting area while moving backwards-towards the MCU.

FIG. 6D—the fruit is located within the cutting region and the first and second cutting elements move towards each other—and the second stem cutting element supports the stem from below.

Figures 6E, 6F:
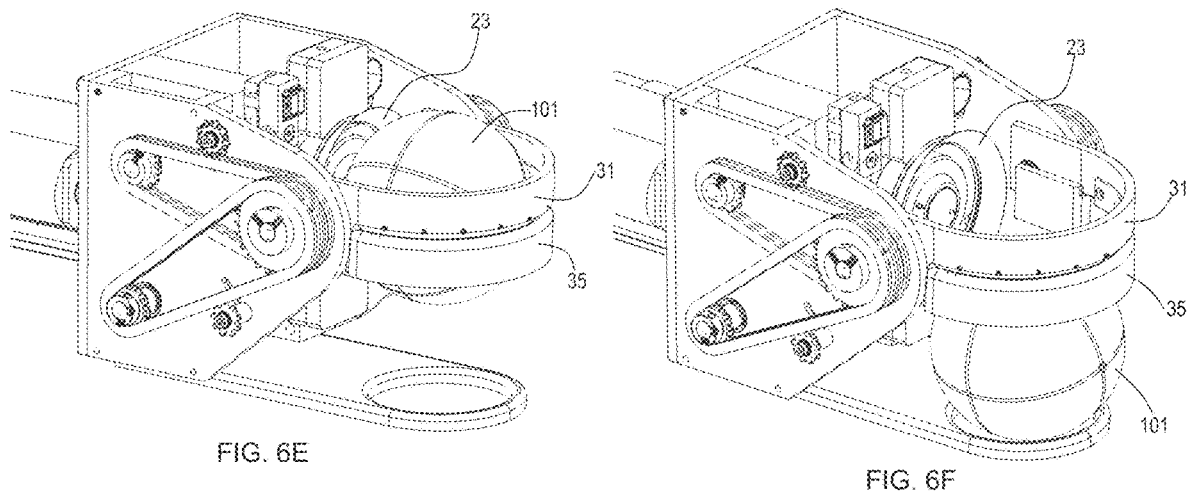

FIG. 6E-first and second cutting elements complete the cut.

FIG. 6F—the fruit is provided to the fruit support element 75.

Figures 6G, 6H:
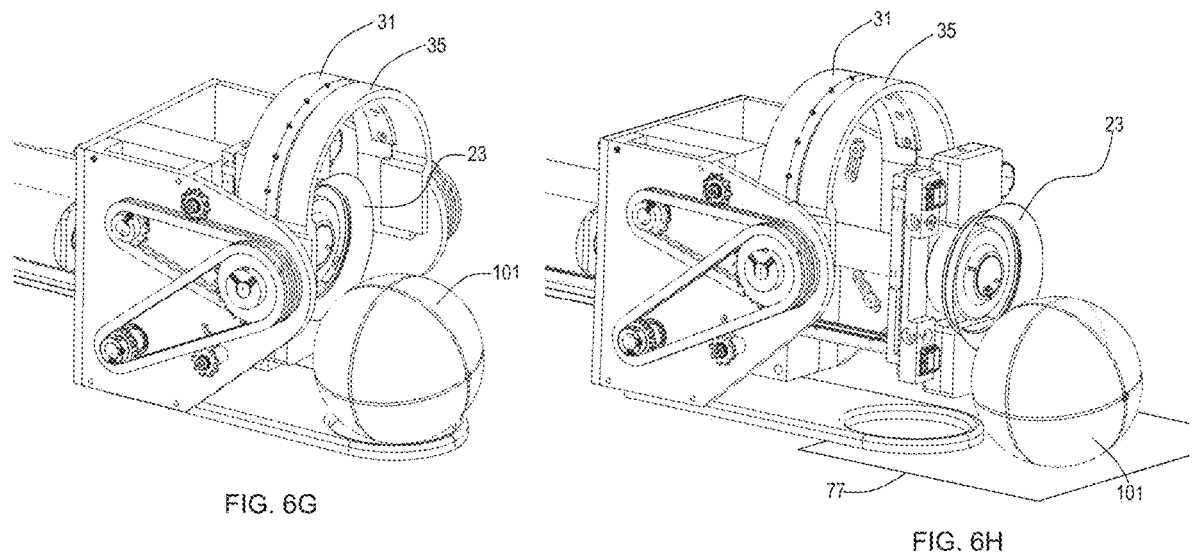

FIG. 6G—the and the first and second cutting elements move to an upward position.

FIG. 6H—the and the fruit is pushed by the VSH towards a collector 77 that may store one or more multiple fruits.

It should be noted that the after the fruit is located within the cutting region and the first and second cutting elements move towards each other (see for example FIG. 6D) and the blades are partially close to each other (for example distant by 0.5, 1, 2 centimeters and the lime)—the vacuum unit may stop the vacuum and the stem may move away from the VSH-thereby reducing the stem residue that will be left after the cutting-move the cutting point closer to the interface between the fruit and the stem.

It should be noted that the after the fruit is located within the cutting region and the first and second cutting elements move towards each other (see for example FIG. 6D) the VSH may move forwards to press the fruit against the first and second stem cutting element immediately after the cut.

The robotic unit may include a frame or a base that may be movable, mobile or static.

FIG. 7 illustrates examples of vacuum sensing and amending a position of the vacuum unit in relation to the fruit.

A single sampling of the vacuum inside the vacuum unit (for example within the static vacuum tube 27 is illustrated by a single vacuum sensor 70. Independently sensing the vacuum within three or four segments of the vacuum units are also shown in FIG. 7. See, for example three segments 27-1, 27-2 and 27-3 and three vacuum sensors 70-1, 70-2 and 70-3. See, for example four segments 27-1, 27-2, 27-3 and 27-4, and four vacuum sensors 70-1, 70-2, 70-3, and 70-4.

FIG. 7 illustrates an misalignment between the fruit 101 and the VSH manipulator 22, and an alignment between the fruit 101 and the VSH manipulator 22. Alignment may be obtained when at least a predefined vacuum force is applied on the fruit—for example when an entirety or at least a predefined majority of the VSH manipulator area applied vacuum on the fruit.

Figure 12:
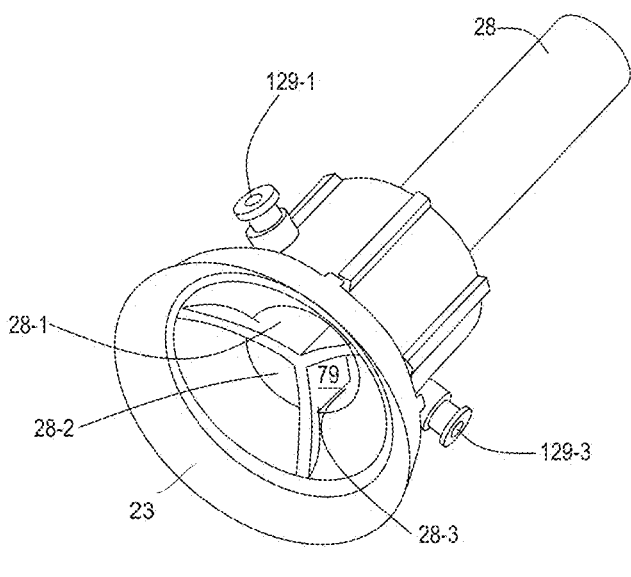
FIG. 12 illustrates and example of parts of the robotic unit.

The vacuum sensing may be performed by sensing vacuum within different spaces formed within the movable FIG. 12 illustrate a VSH interface and a mechanical separator 79 position in proximity to VSH interface 23 and virtually separates at least a segment of the rotating vacuum tube 28 to three vacuum tube segments 28-1, 28-2 and 28-3, whereas three vacuum conduits 129-1, 129-2 and a third vacuum conduit (not shown) allow vacuum sensors (not shown) to sense the vacuum within each one of three vacuum tube segments 28-1, 28-2 and 28-3.

Figure 9:
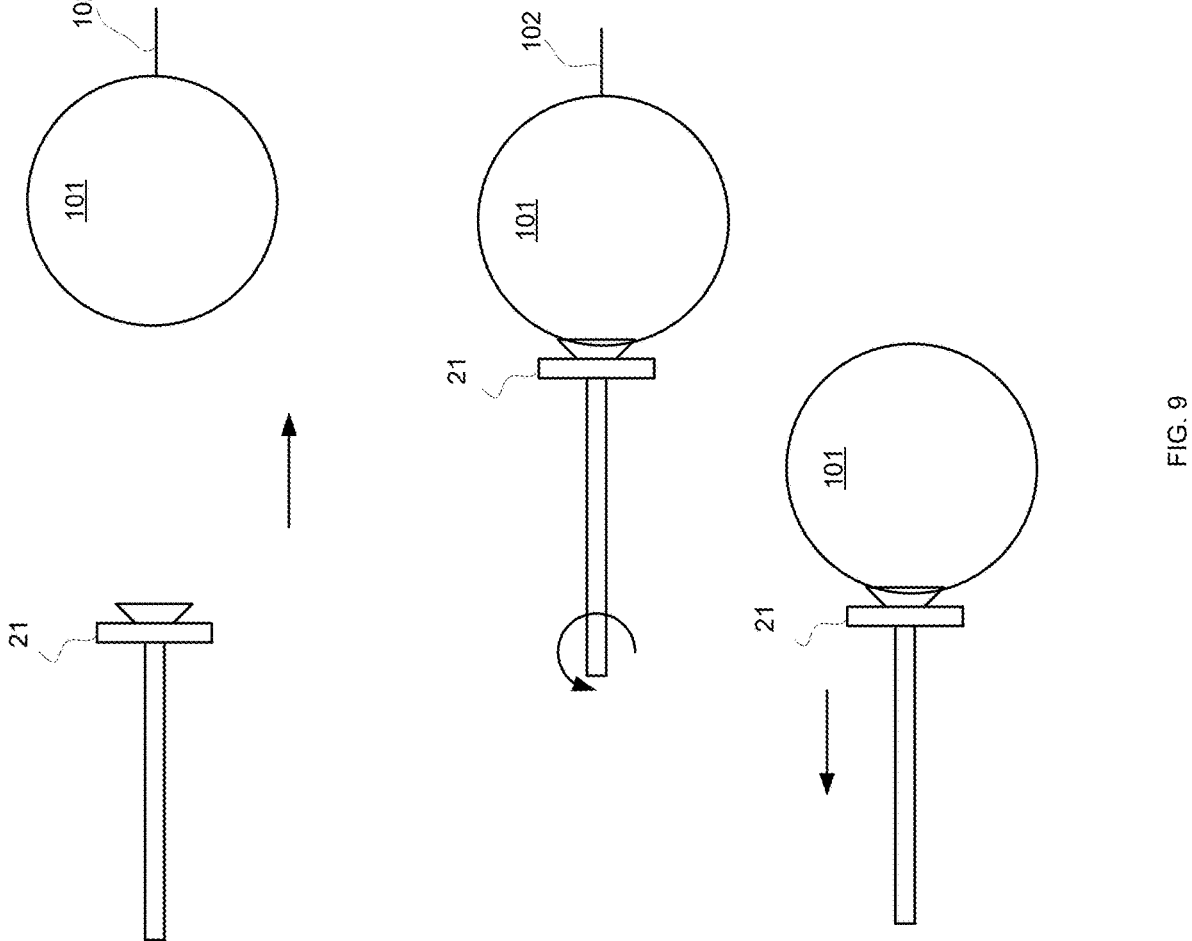
FIG. 9 illustrates an example of a vacuum only harvesting of a fruit.

FIG. 9 illustrates an example of a vacuum only harvesting of a fruit. For simplicity of explanation MCU was not shown—as it does not participate in the example provided in FIG. 9.

FIG. 9 illustrates the following stages:

Initial approach of the VSH 21 towards the fruit 101 with the stem.

Applying vacuum, by the VSH 21 on the fruit while rotating the fruit. The applying vacuum may be executed while rotating the fruit and/or applying any linear movement (for example backwards or forwards) of the VSH.

After disconnecting-moving the VSH towards the fruit support element 75 and/or the fruit collector 77.

Figure 10:
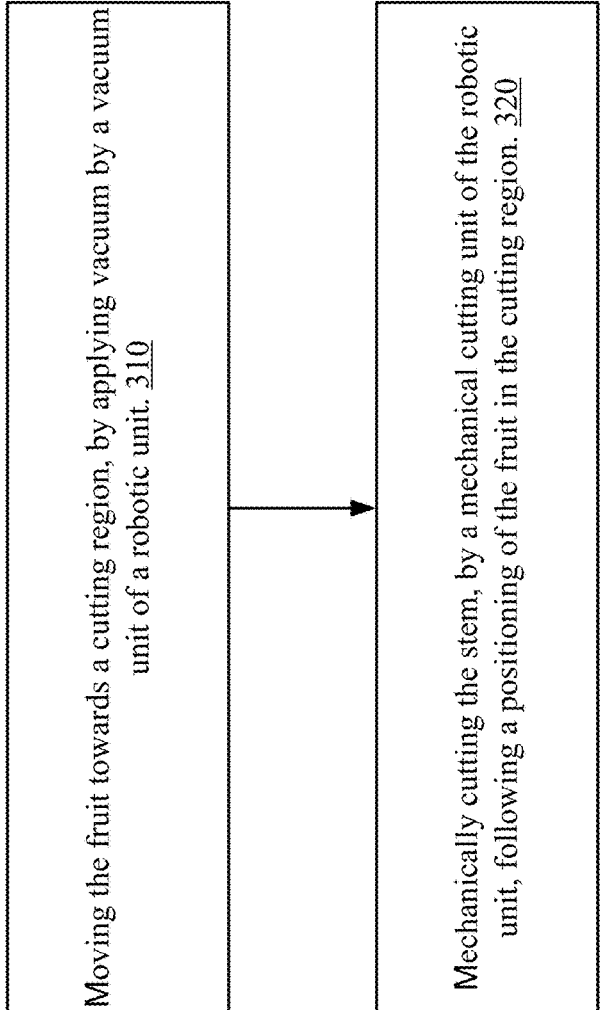
FIG. 10 illustrates an example of a method for harvesting the fruit.

FIG. 10 illustrates an example of method 300 for harvesting a fruit having a stem.

Method 300 may be executed by any of the robotic units mentioned above.

Method 300 may start by step 310 of moving the fruit towards a cutting region, by applying vacuum by a vacuum unit of a robotic unit.

Step 310 may be followed by step 320 of mechanically cutting the stem, by a mechanical cutting unit of the robotic unit, following a positioning of the fruit in the cutting region.

Figure 11:
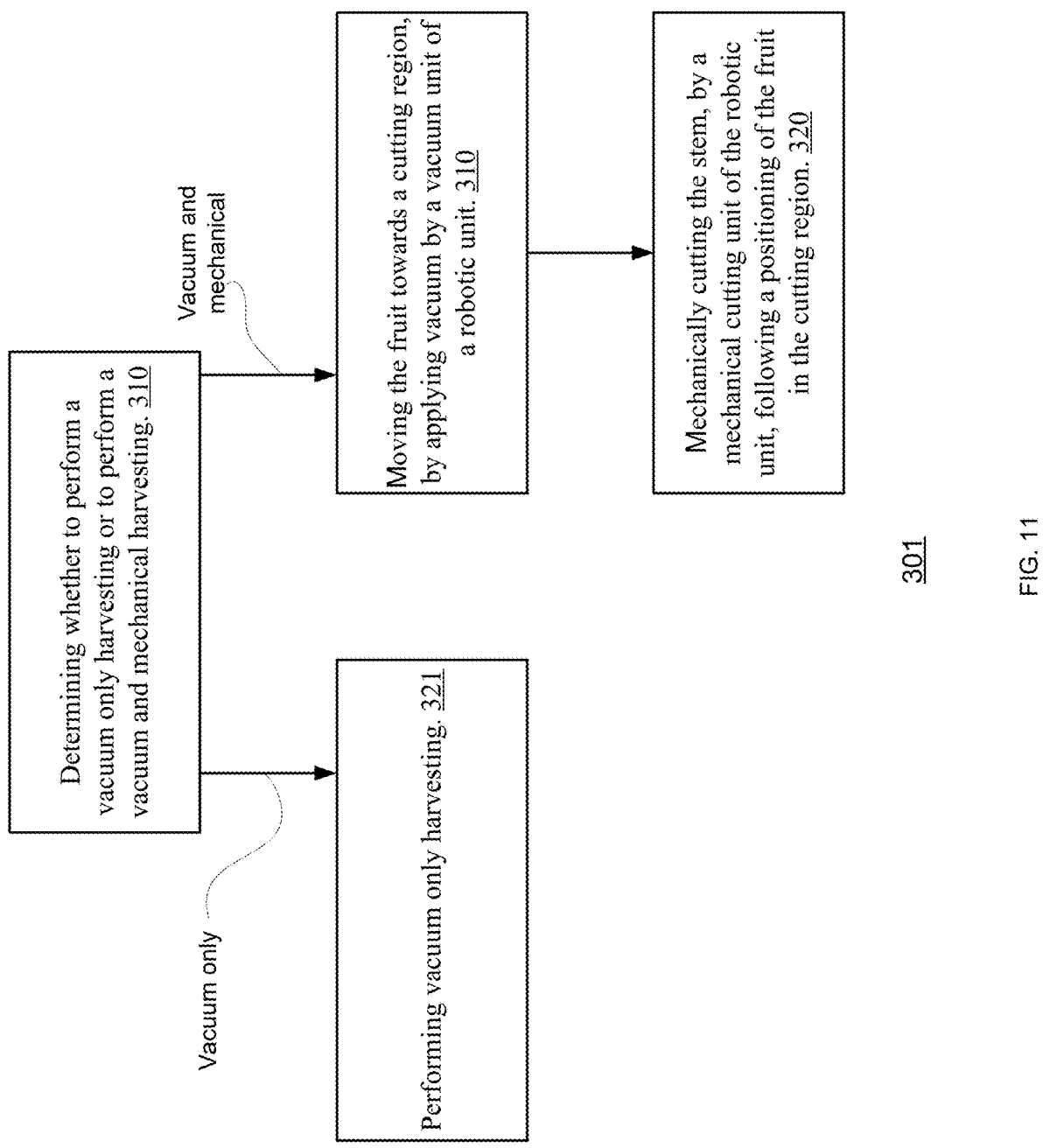
FIG. 11 illustrates an example of a method for harvesting the fruit.

FIG. 11 illustrates an example of method 301 for harvesting a fruit having a stem.

Method 301 may be executed by any of the robotic units mentioned above.

Method 301 may start by step 311 of determining whether to perform a vacuum only harvesting or to perform a vacuum and mechanical harvesting. The determining may be made by an operator of the robotic unit, or may be made in any other manner. For example based on previous cutting attempt of other fruits—for example other fruits of the same tree, other fruits from the same type as the current fruit to be harvested, other fruits of the same farmer, and the like.

The determining may be based, at least in part, on the capability to harvest the fruit without damaging the fruit or the tree.

The determining may also be based on the status of the MCU—for example—whether the MCU is faulty and vacuum only harvesting can be executed.

When determining to perform a vacuum only harvesting then step 311 may be followed by step 321 of performing vacuum only harvesting.

When determining to perform vacuum and mechanical harvesting-then jumping to step 310 of moving the fruit towards a cutting region, by applying vacuum by a vacuum unit of a robotic unit. Step 310 may be followed by step 320 of mechanically cutting the stem, by a mechanical cutting unit of the robotic unit, following a positioning of the fruit in the cutting region.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Any reference to "comprising" should be applied "mutatis mutandis to "consisting" and should be applied mutatis mutandis to "consisting essentially of".

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A robotic unit for harvesting a fruit having a stem, the robot unit comprises:
   a vacuum unit that is configured to move the fruit, by applying vacuum, towards a cutting region; and
   a mechanical cutting unit that is configured to mechanically cut the stem following a positioning of the fruit into the cutting region;
   wherein the mechanical cutting unit comprises one or more stem cutting elements and one or more stem cutting elements manipulators that are configured to move the one or more stem cutting elements during a cutting of the stem;
   wherein the one or more stem cutting elements comprises a first stem cutting element and a second stem cutting element; and
   wherein the one or more manipulators are configured to rotate the second stem cutting element about a second axis to a stem supporting position, and then rotate the first stem cutting element to cut the stem.

2. The robotic unit according to claim 1, wherein the vacuum unit that is configured to move a fruit having a stem, by applying vacuum, into the cutting region.

3. The robotic unit according to claim 1, wherein the vacuum unit comprises a vacuum suction head (VSH), and a VSH manipulator that is configured to move the VSH, wherein the VSH comprises a VSH interface for interfacing with the fruit.

4. The robotic unit according to claim 3, wherein the VSH manipulator is configured to move the VSH to a fruit contact position while the fruit is positioned outside the cutting region, and to move the VSH to a fruit cutting position in which the fruit is placed within the cutting region.

5. The robotic unit according to claim 3, wherein the VSH interface is elastic.

6. The robotic unit according to claim 3, wherein the VSH manipulator is configured to move the VSH interface from a (i) first position in which the VSH interface is located within the cutting region, to (ii) a second position in which the VSH interface is located outside the cutting region.

7. The robotic unit according to claim 1, comprising one or more vacuum sensors that are configured to sense vacuum values at one or more regions of the fruit.

8. The robotic unit according to claim 7, comprising a controller that is configured to control at least one parameter of the harvesting of the fruit based on outputs from the one or more vacuum sensors.

9. The robotic unit according to claim 8, wherein the at least one parameter is a spatial relationship between the VSH and the fruit.

10. The robotic unit according to claim 7, wherein the one or more vacuum sensors are multiple vacuum sensors and that one or more regions of the fruit are multiple regions of the fruit.

11. The robotic unit according to claim 1, comprising a fruit support element configured to support the fruit following the cutting of the stem.

12. The robotic unit according to claim 1, wherein the first stem cutting element comprises a blade and a blade support element, wherein the second stem cutting element comprises a cutting surface and a cutting surface support element.

13. The robotic unit according to claim 1, comprising a controller that is configured to determine an angle of rotation of the second stem cutting element to be positioned in the stem supporting position, wherein the angle of rotation is selected out of an allowable range of angles of rotation.

14. A robotic unit for harvesting a fruit having a stem, the robot unit comprises:
   a vacuum unit that is configured to move the fruit, by applying vacuum, towards a cutting region; and
   a mechanical cutting unit that is configured to mechanically cut the stem following a positioning of the fruit into the cutting region;
   wherein the mechanical cutting unit comprises one or more stem cutting elements and one or more stem cutting elements manipulators that are configured to move the one or more stem cutting elements during a cutting of the stem;
   wherein the one or more stem cutting elements comprises a first stem cutting element and a second stem cutting element; wherein the robotic unit further comprises one or more motors, gears, axels, first chains, second chains, first sprockets and second sprockets, wherein the one or more motors are configured to rotate the gears, wherein the gears are configured to rotate the axels and the first sprockets, wherein the first sprockets are configured to rotate the chains, wherein the chains are configured to rotate the second sprockets, wherein the second sprockets are configured to rotate the first stem cutting element and the second stem cutting element.

15. The robotic unit according to claim 14, wherein the chains, the first sprockets and second sprockets are positioned on both sides of an internal region of the robotic unit, the internal region partially overlaps the cutting region.

* * * * *